(12) United States Patent
Devitt

(10) Patent No.: US 9,598,758 B2
(45) Date of Patent: *Mar. 21, 2017

(54) VERTICAL AXIS WIND TURBINE

(71) Applicant: American Offshore Energy, LLC, Aston, PA (US)

(72) Inventor: Andrew J. Devitt, Media, PA (US)

(73) Assignee: American Offshore Energy, Aston, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/611,840

(22) Filed: Feb. 2, 2015

(65) Prior Publication Data

US 2015/0337800 A1 Nov. 26, 2015

Related U.S. Application Data

(63) Continuation of application No. 13/544,625, filed on Jul. 9, 2012, now Pat. No. 8,943,688, which is a (Continued)

(51) Int. Cl.
*F03D 9/00* (2016.01)
*C23C 4/08* (2016.01)
(Continued)

(52) U.S. Cl.
CPC ............ *C23C 4/08* (2013.01); *C23C 4/04* (2013.01); *C23C 4/129* (2016.01); *F01D 25/285* (2013.01); *F03D 3/005* (2013.01); *F03D 3/061* (2013.01); *F03D 7/06* (2013.01); *F03D 9/002* (2013.01); *F03D 13/25* (2016.05); *F03D 80/70* (2016.05); *F05B 2220/7066* (2013.01);
(Continued)

(58) Field of Classification Search
USPC .......................................................... 290/55
See application file for complete search history.

(56) References Cited

U.S. PATENT DOCUMENTS 206,631 A 7/1878 Smith
4,119,863 A 10/1978 Kelly
(Continued)

FOREIGN PATENT DOCUMENTS

DE 3209347 9/1983
DE 10337278 3/2005
(Continued)

OTHER PUBLICATIONS

Musial M. et al. "Feasibility of Floating Platform Systems for Wind Turbines", Nov. 2003.

*Primary Examiner* — Joseph Waks
(74) *Attorney, Agent, or Firm* — Volpe and Koenig, P.C.

(57) ABSTRACT

A vertical axis wind turbine (VAWT) may be configured to include air or water bearing supports. The VAWT may be configured to float. The VAWT may include a 360° rotor, having a precision machined noncorrosive bearing surface at its perimeter, with a system of wind capturing devices configured to collect kinetic energy of wind. The rotor may be supported by at least three air or water bearing supports positioned substantially at a perimeter of the rotor. Electrical generation components may be located substantially at the perimeter of the rotor.

6 Claims, 5 Drawing Sheets

Related U.S. Application Data continuation of application No. 12/621,191, filed on Nov. 18, 2009, now Pat. No. 8,217,526.

(60) Provisional application No. 61/115,602, filed on Nov. 18, 2008, provisional application No. 61/158,148, filed on Mar. 6, 2009.

(51) Int. Cl.
*F01D 25/28* (2006.01)
*F03D 7/06* (2006.01)
*C23C 4/04* (2006.01)
*F03D 3/00* (2006.01)
*F03D 3/06* (2006.01)

(52) U.S. Cl.
CPC ..... *F05B 2240/511* (2013.01); *F05B 2240/53* (2013.01); *F05B 2240/917* (2013.01); *F05B 2240/95* (2013.01); *F05B 2240/96* (2013.01); *Y02E 10/727* (2013.01); *Y02E 10/728* (2013.01); *Y02E 10/74* (2013.01); *Y02P 70/523* (2015.11); *Y10T 29/4932* (2015.01); *Y10T 29/49885* (2015.01); *Y10T 29/49982* (2015.01); *Y10T 29/49995* (2015.01)

(56) References Cited

U.S. PATENT DOCUMENTS

| | | | |
|---|---|---|---|
| 4,332,427 A | 6/1982 | Sargent et al. | |
| 4,523,365 A | 6/1985 | Richmond | |
| 4,832,569 A | 5/1989 | Samuelsen et al. | |
| 6,024,491 A | 2/2000 | Bak | |
| 6,160,336 A | 12/2000 | Baker et al. | |
| 6,431,107 B1 * | 8/2002 | Byle | B63B 21/502 |
| | | | 114/264 |
| 6,629,815 B2 | 10/2003 | Lusk | |
| 7,156,586 B2 | 1/2007 | Nim | |
| 7,385,302 B2 | 6/2008 | Jonsson | |
| 7,397,144 B1 | 7/2008 | Brostmeyer et al. | |
| 7,462,950 B2 | 12/2008 | Hu | |
| 7,503,750 B1 | 3/2009 | Violette | |
| 7,948,101 B2 | 5/2011 | Burtch | |
| 8,021,101 B2 | 9/2011 | Segovia et al. | |
| 8,217,526 B2 * | 7/2012 | Devitt | C23C 4/04 |
| | | | 290/55 |
| 8,689,721 B2 * | 4/2014 | Wang | B23P 11/00 |
| | | | 114/264 |
| 8,742,613 B2 * | 6/2014 | Chen | F03D 5/04 |
| | | | 290/55 |
| 2008/0286112 A1 | 11/2008 | Rowan et al. | |
| 2009/0072544 A1 | 3/2009 | Pao | |
| 2010/0072835 A1 * | 3/2010 | Klatt | H02K 5/00 |
| | | | 310/54 |
| 2010/0133851 A1 * | 6/2010 | Devitt | C23C 4/04 |
| | | | 290/55 |
| 2010/0207389 A1 * | 8/2010 | Nyffenegger | F03B 13/00 |
| | | | 290/44 |
| 2010/0278465 A1 | 11/2010 | Klusman et al. | |
| 2010/0320766 A1 * | 12/2010 | Klukowski | F03B 13/183 |
| | | | 290/53 |
| 2011/0148115 A1 | 6/2011 | Roznitsky et al. | |
| 2012/0099993 A1 * | 4/2012 | Guerenbourg | F03D 11/0008 |
| | | | 416/174 |
| 2012/0211987 A1 * | 8/2012 | Roe | F03B 13/16 |
| | | | 290/53 |

FOREIGN PATENT DOCUMENTS

| | | | |
|---|---|---|---|
| ES | 2003473 A * | 6/1986 | ............... F03D 5/04 |
| GB | 2129060 | 5/1984 | |
| GB | 2378679 | 2/2003 | |
| WO | 03016714 | 2/2003 | |
| WO | 2009/036107 | 3/2009 | |

* cited by examiner

VERTICAL AXIS WIND TURBINE

CROSS REFERENCE TO RELATED APPLICATIONS

This application is a continuation of U.S. patent application Ser. No. 13/544,625, filed on Jul. 9, 2012, now U.S. Pat. No. 8,943,688, which is a continuation of U.S. patent application Ser. No. 12/621,191, filed Nov. 18, 2009, now U.S. Pat. No. 8,217,526, which claims the benefit of U.S. Provisional Patent Application No. 61/115,602, filed on Nov. 18, 2008 and U.S. Provisional Patent Application No. 61/158,148, filed Mar. 6, 2009, all of which are incorporated by reference as if fully set forth herein.

FIELD OF INVENTION

This invention relates to a gearless vertical axis wind turbine with bearing support and power generation at its perimeter.

BACKGROUND

Power companies need smooth, dependable power. Their experience is almost entirely with fossil fuel, hydroelectric and nuclear energy sources which have very predictable outputs of electricity. As the percentage of electricity generated by wind power increases so will the amount of variability that they need to account for. The necessary spinning reserve turbines, which can be fired up quickly when the wind dies, represent an inefficiency and direct cost that reduces the marginal value of wind energy. Many resources are currently being spent trying to develop storage technologies which would enable spreading the power more evenly across time. So far, only compressed air storage and pumped hydro-storage have the capacity to practically time shift wind energy. Unfortunately, these means are very inconvenient to implement and inefficient.

Wind turbines employ two basic principles to capture energy from moving air. Aerodynamic turbines use low pressure lift; impulse turbines use drag. The differentiating factor between the two is the blade tip speed. For aerodynamic turbines, the blade tip speed is a multiple of the wind speed. In contrast, an impulse turbine can never spin faster than the wind speed. An anemometer, an often used device for measuring wind speed, is an example of an impulse type device. Conventional horizontal axis wind turbines (HAWTs) are an example of aerodynamic turbines with tip speeds reaching 100 meters per second (m/s) or 400 miles per hour.

Recent engineering and technical development in modern HAWTs have resulted in driving their efficiencies to around 35%. The theoretical maximum efficiency is limited by "Betts law" to 59%. A wind turbine cannot be 100% efficient as this would imply that the air exiting the turbine would have zero velocity and so would prevent other air from flowing through the turbine.

Efficiency factors are also misleading in that they presume a certain wind speed which is usually not accurate. For instance a HAWT may have a 30% efficiency for the wind speed of 14 m/s, but will not even spin, meaning it would have zero efficiency with a 5 m/s wind. This would be an example of what appears to be logical optimization of the wind turbine specifications. The energy in wind is a cubed function of its velocity and so optimizing wind turbine efficiencies for high wind speed results in large megawatt ratings. This is also the number that is used to describe how big a wind farm is, as in it is a 200 or a 400 Megawatt (MW) wind farm.

According to the National Renewable Energy Laboratory (NREL) wind resource map of the continental United States, the best wind resources appear to be class 3 and 4 winds over the Rocky Mountain and Great Plains states. Class 3 and 4 winds represent a yearly average of 6.7 m/s and 7.25 m/s respectively at 50 m above ground. If the average wind speed is 7 m/s, wind speeds of 14 m/s are not likely to happen even a quarter of the time, once factoring in the capacity factors. Capacity factors are based on the power curve for the particular wind turbine and wind speed data from the proposed site that the turbine will be placed on and are typically claimed to be 25 to 30%. The current paradigm of HAWTs are designed to have their highest efficiencies in the higher wind speed ranges, which makes sense in the context of the velocity cubed section of the wind power equation. The goal is to be most efficient when there is the most energy to harvest. This results in high MW ratings for the turbines but results in low capacity factors, meaning that the turbine will generate its rated capacity only a small fraction of the time. This results in "peaky power", that is, most of the power is made over a relatively short period of time.

The high tip speeds of HAWTs mentioned above create another disadvantage for the large, conventional aerodynamic turbines. A 100 m swept area has a 314 m circumference and at 20 revolutions per minute (rpm), the tips travel 104 m/s. This is a fundamental limitation on the scalability of HAWT. The tip speed for larger swept areas is limited by the speed of sound and the specific strength of the blade material to withstand the centrifugal forces. This speed presents a fundamental risk for birds and from fatigue forces over time causing catastrophic blade failure. In the aerodynamic design, the blades are a relatively small percentage of the swept area, making it inviting for birds to try to fly through. The blade design is also the main reason that the aerodynamic design needs a relatively high wind speed just to start to spin. Combined with the friction from the gearbox and bearing systems, HAWTs are not effective in low wind speeds.

Wind speed is seldom constant and since the tip speed of a conventional HAWT is a multiple of the wind speed, there is significant variation in the speed of the rotor. This causes huge "on again—off again" loads that stress the longevity of gear boxes. Additionally, the speed change is on the wrong end of the gear box, which then increases the speed of the rotor 100 times. Consequently, a small change in the speed of the rotor will result in a large change in the speed at the generator. These factors combine to make the frequency of current generated highly variable and erratic. As a result, this requires expensive electricity to condition the grid. In most cases alternate current (AC) asynchronous generator current is rectified to direct current (DC). Then, the DC is inverted back to AC three-phase 60 Hz digitally (as a sine wave in little steps). There are capital costs, efficiency losses, cooling systems, power quality problems and maintenance issues that must be borne with this method.

When the focus of the industry changes from the MW rating of the turbine to useful load matching, there will be more interest in turbines optimized for average wind speeds. Vertical axis wind turbines (VAWTs) in an impulse configuration have a relatively high efficiency in lower wind speeds because of their higher blade areas and percentage of swept area. Although not as efficient, this design will make power most of the time the wind is blowing. This is more desirable for power companies and mitigates the need for time shifting or storing wind generated electricity.

The capital costs and the reliability of the gearboxes needed to step up the speed of the main shaft to a speed which is useful for generating electricity are other factors in wind power generation. The gearbox contains hundreds of precision parts. The quality of the bearings, the profiles of the gear teeth, the stiffness of the gearbox casing and many other issues make gearbox manufacturing a precision engineering art. Precision machine tools and skilled labor are required to construct the components for these gearboxes. Considering gearboxes account for approximately 30% of the cost of the new turbine, gearbox availability has been a limiting factor in the supply chain for wind turbines. Once in service, a failure of any single part is likely to result in the failure of the entire gearbox. The risk of new, larger machines and unproven gearbox designs will be an impediment to reaching offshore winds. Installation and maintenance costs of offshore turbines are three times the cost of land-based turbines, which has prevented the East Coast from having a single offshore wind turbine. The present invention would eliminate the costs associated with the gearbox and additionally result in shorter manufacture times for turbines.

The broad support base and low center of gravity in the VAWT conveniently enables flotation of the turbine. Trying to float a HAWT is comparatively much more difficult, because a mass fixed high on a heavy pole is fundamentally unstable. Flotation is a key design aspect of the present invention. Research by the NREL has confirmed the huge potential advantages of floating wind turbines, including estimates of over 1000 GW of estimated power in offshore wind resources surrounding the continental United States.

As mentioned above, the energy in the wind increases as the cube function of its velocity, so class 6 winds have more than double the energy of class 4 winds. Also the wind velocity near the surface is much higher and this reduces the need to elevate the turbine into the air. These two factors, along with a multitude of other advantages, effectively counteract the relative inefficiency of the vertical axis wind turbine.

Power transmission is also a problem associated with making wind power a viable energy solution. As noted before, the best winds on the continental United States are class 3 and 4 winds in the Great Plains and Mountain states which are 1500 miles from major load centers. However, there are class 6 winds just 30 miles offshore. Over 75% of the electricity consumed is along the coasts and Great Lakes which are nearly the best wind resources available to the United States. Undersea cables are much less expensive to permit and do not require high tension towers. And clearly, the 30 to 50 mile offshore range is significantly shorter than the 1500 mile run currently contemplated and needed to transmit power to and from the East Coast. Such shorter distances result in reduced costs and transmission losses. In fact, undersea cables have a very significant advantage in that they are insulated from summertime heat. Higher temperatures reduce the conductivity of transmission cables, so when the grid is most strained, during the summer heat, that heat reduces the transmission capacity. Alternatively, undersea cables are not subject to this loss, which is amplified by the longer length of landlines.

Power plants are often located near the coasts or Great Lakes for access to coal and cooling water. Many of these power plants have been decommissioned or are only used for peak load because of old turbine/generator technology. However, their connection to the grid still exists. They were intentionally located near the high demand centers and offer the ultimate in "smart grid recycling", providing ready-made high amperage distribution points for offshore wind power.

An additional advantage of VAWTs over HAWTs involves wind direction and maximizing power generation. VAWTs are not sensitive to wind direction and do not require being pointed into the wind. In contrast, HAWTs need to be pointed into the wind, and so far, there has been no reasonable plan to deal with this issue except for huge, economically impractical floats. The proposed 3-point floatation provides convenient places for three mooring tethers to provide the required anti-rotation. The VAWT will always wind up and tighten its tethers in the same direction, while the HAWT needs to be actively pointed into the wind. Accordingly, there is a need to provide VAWT capable of generating power offshore.

The floating VAWT would address many of the technology and policy problems of a marine-based HAWT. Because the turbines solve the flotation problem, no foundation is required on the sea floor. This is a huge reduction in marine citing costs, making them cheaper to site than land-based turbines. The VAWT would be built on shore, towed out to a field of mooring anchors, tied up and plugged in. No crane or assembly would be required at sea, again resulting in an order of magnitude cost-reduction.

Recent policy decisions by high-ranking government officials indicate that offshore wind energy is becoming a top priority. The proposed invention for floating offshore wind turbines is not just consistent with, but enables, the new national policy direction by eliminating policy, cost and technical roadblocks as mentioned above.

Because the wind farms for the VAWTs would be located in deep water which have been off-limits to HAWT, there is not an either-or choice between the turbine technologies. VAWTs may be seen as an additional layer of wind energy capacity that can be built on top of the already existing wind turbine manufacturing industry. Due to the higher quality winds and lower costs associated with VAWTs, there is a need for this turbine technology.

SUMMARY

A vertical axis wind turbine comprising a 360° rotor with an aerodynamic or impulse based system of blades or deployable sails attached to it for collecting the kinetic energy of the wind, the rotor being supported on a three-point independent fluidic or magnetic bearing support points. A vertical axis wind turbine comprising; a three-point bearing support bearing employing fluidic or magnetic bearing technology to support a rotor of 360° which has an aerodynamic or impulse based systems of blades or deployable sails attached to it for collecting the kinetic energy of a wind. A wind turbine with permanent magnets arrayed around the inside perimeter of the rotor with segments of coils arranged in close proximity to the magnets at each of the bearing points for the purpose of generating electricity. A wind turbine with coils arrayed around the inside perimeter of the rotor which are connected via slip ring to a variable current for the purpose of varying the resistance and the amount of electricity generated for a given rpm. This makes it possible to have a constant rpm machine and so provide 60 hz 3 phase power directly, without conversion from AC to DC and back to AC.

DETAILED DESCRIPTION OF THE PREFERRED EMBODIMENTS

Bearing technology with the capacity and speed to support a large swept area at the perimeter of a vertical axis wind turbine (VAWT) has recently become commercially available. Hydro turbines and steam turbines both use hydro bearings to support their rotors. Government grants are currently being solicited for request for proposals related to bearing systems and wind turbines.

When referred to hereafter, the terminology "bearing" may include a magnetic bearing, air bearing, hydro bearing or any other fluidic bearing. When referred to hereafter, the terminology A wind capturing device may include a blade, deployable sail, vain, or air foil.

A VAWT as shown in FIGS. 1-4 may be manufactured with the following techniques. The novel three-point stance is accomplished by first providing at least three concrete footers 100 or small foundations to which the bearings 150 will be attached. The concrete footers are arrayed 120° apart from each other and approximately under the perimeter of the turbine, thus creating an equilateral triangle. This is a kinematic support method which avoids the problems of a 360° base needing to be precision fit to the 360° rotor. By eliminating the base and using a three-point support, the bearings will always be presented parallel to the rotor bearing face and in a plane no matter how much distortion there is in the rotor or the position of the three-point footers.

Figures 1, 2:
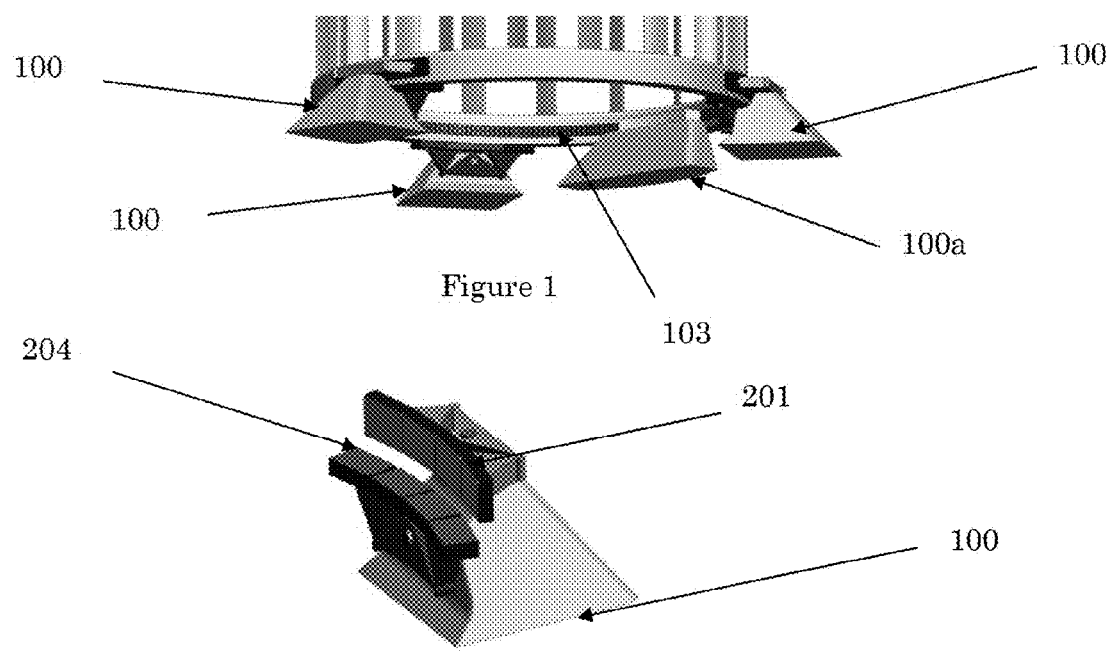
FIG. 1 is a view of a proposed VAWT.
FIG. 2 is a perspective view of a concrete footer.
Figure 3:
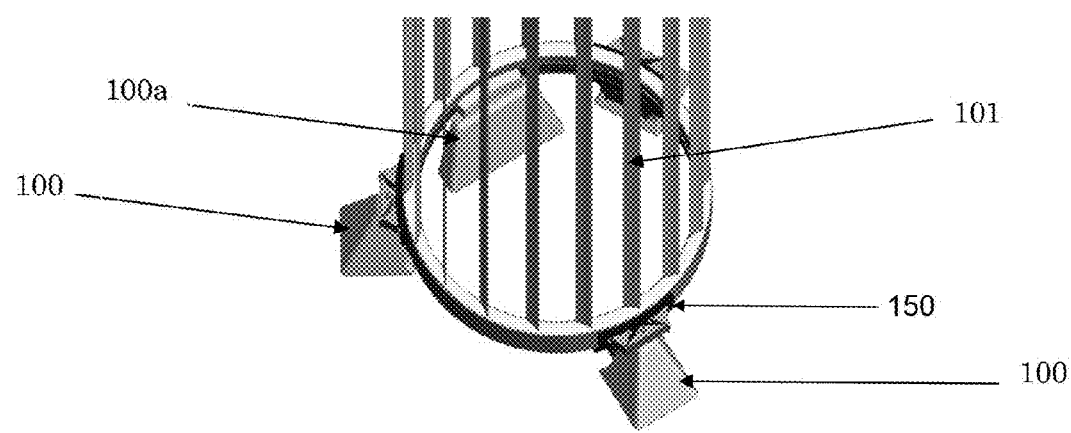
FIG. 3 is an above-perspective view of a proposed VAWT.
Figure 4:
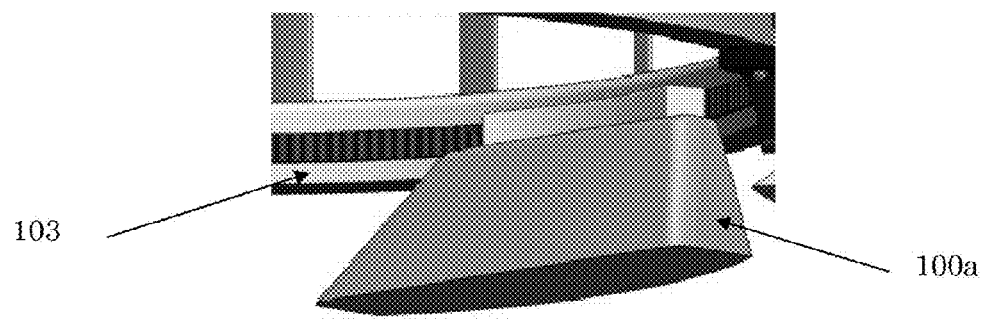
FIG. 4 is another perspective view of a concrete footer.

The concrete footers 100 may project from the earth a typical 1 to 3 m. Because the corners of the triangle are located relatively far apart from each other, as compared to a single point stance of conventional HAWTs, the moment forces that are exerted on the upper sections of the turbine are spread across a much wider support scheme at the base. Depending on the total weight of the rotor and aerodynamic structure, it may be necessary to have a third bearing race on top of the rotor to hold down the windward side of the rotor in heavy winds. Because of the broad support, the total amount of concrete required is dramatically reduced. Large steel pins 201 are cast into the concrete footers which provide the connection between the footers and the bearing elements as seen in FIG. 2.

For very large turbines, where it may be necessary to support hundreds of tons, bearings may be ganged together in a wiffle-tree fashion. This technique is common practice for locomotive and cargo crane wheels as a method for being sure that multiple wheels or in this case bearings see an even distribution of load at all times. If 7 spherical pivots are used, 4 bearings may be mounted; if 3 pivots are used, 2 bearings may be mounted. Even when using a single bearing, it should be free to pivot to become parallel with the rotor.

Figure 9:
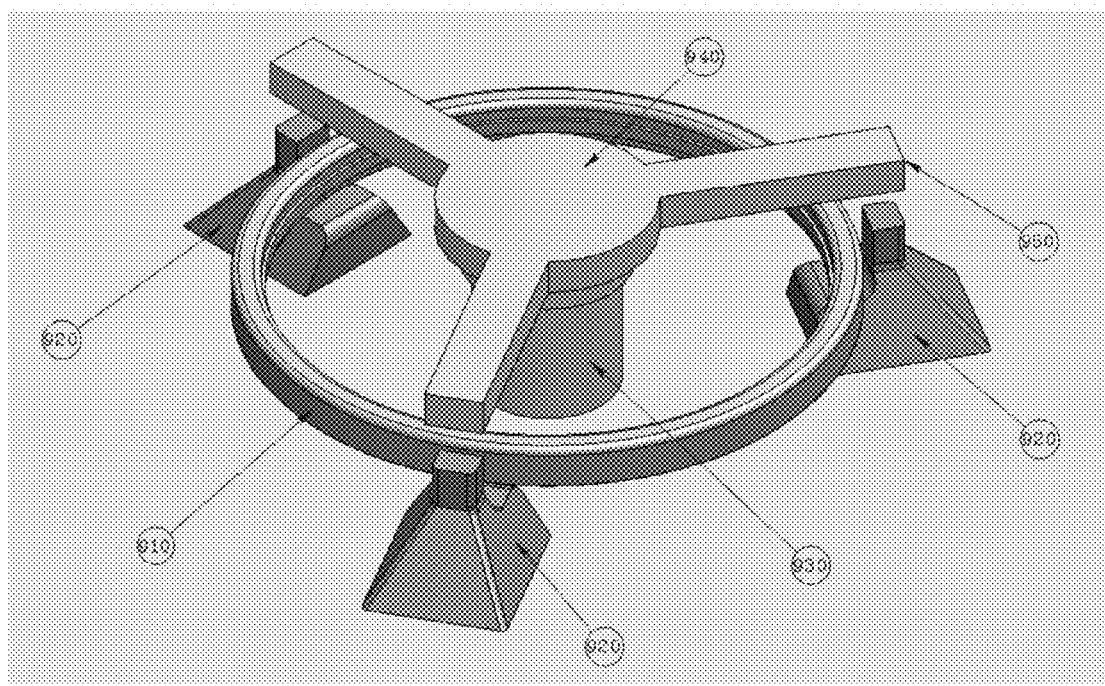
FIG. 9 is another perspective view of a proposed VAWT.

Another feature of this embodiment is the ability to transport and precision machine a massive rotor 910 as shown in FIG. 9. A method for manufacturing large rotors for VAWTs and flywheel energy storage with fluidic or magnetic bearing races can be achieved through the following method. Pre-rolled or bent steel is welded together to comprise the rotor. The completed rotor will be supported by, but not in contact with, at least three points, evenly spaced around the circumference as described above. There is also a center abutment 930 that is fitted with a large spindle 940. The spindle may be a rolling element, plane bearing, hydrostatic or air bearing spindle for example. This spindle is used as a crane to position the steel segments around the perimeter. The spindle also provides a way to measure the position of the steel elements before welding. The steel segments are welded together. The center spindle is designed so that using multiple arms 950, it may support the entire steel rotor. The center spindle is fitted with a motor for driving the rotor. One of the perimeter pedestals 920 is fit with modular machine tool slides. Spindles and tools may be mounted to the slides in order to precision machine the rotor in-place. After the machining operation, these slides, or another set of slides, are fit with a flame spray apparatus. The flame spray apparatus is used to deposit a coating of nickel, or other appropriate noncorrosive material, onto the prepared and machined bearing surfaces on the rotor. This coating is built up to be more than a millimeter thick. The flame sprayed nickel is then precision machined or ground. In this way a noncorrosive bearing surface with the appropriate precision can be created in the field. This avoids the problems associated with having to transport such a large rotor. Such rotors can be used as flywheels and energy storage devices or as rotating bases for vertical wind turbines. In order to reach the highest possible rotational speeds, it may be necessary to use continuous carbon fiber windings around the outside perimeter of the rotor. Fluidic or magnetic bearings are then used to kinematically support the rotor while it is spinning as a wind turbine or energy storage device.

The aerodynamic or impulse scheme for collecting the energy from the wind is constructed on top of the rotor which is supported on the near frictionless fluidic or magnetic bearings. A scheme for collecting the energy from the wind should be light-weight. Multiple (at least three) posts such as sailboat masts are arrayed vertically with their base attached to the lower rotor described above. It is common practice in sailboat construction to have a mast supported by stays (wires) which attach at the bow and stern of the ship to provide forward and backward stability to the mast. Side to side stability is also provided by stays which mount in the deck to port and starboard of the mast. These stays are under tension and work against the column stiffness of the mast. In this way, a 7-to-1 ratio between the height of the mast and the distance between the port and starboard stays on the deck can easily be achieved. By connecting the tops of the masts together, either with a single monolithic piece of fiberglass (which can also be fabricated on site using conventional techniques) or by modular pieces linking the top of each mast, a cylindrical shape may be created. By further employing stays which connect this top structure and/or the tops of the masts to the lower rotor on chords of the cylinder, in a similar fashion to bicycle spokes, produces a very stiff yet lightweight cylindrical shape. In summary, a structure which is stiff, regarding both bending and torsion, may be constructed by using wires in tension, columns/masts in compression and the hoop stiffness of the lower and upper rotors.

A proposed VAWT may run at an exact speed to have the rotor coils and stator poles generate three-phase, 60 Hz power directly for the grid. Additionally, limited power conditioning equipment is required. First, a generator will be located on the perimeter of the rotor, so it has the high surface-speed required to produce 60 Hz. Because it does not have a 100-to-1 generator between it and the rotor, it experiences much less speed variability. Second, the speed variability could be reduced more by placing the mass of the lower rotating ring intentionally high to increase its inertia and dampen the effects of changing wind speed. Alternatively, it is possible to servo the magnetic field in the rotor coils to maintain a constant rotation speed. As a result, when the wind blows harder, the control system increases resistance in the magnetic field, keeping the rotation speed constant but the electrical current output increases. This would be an effective way to eliminate the cost and problems associated with power conversion equipment. However, this technique would not be as economical to produce and potentially would not be as efficient as a permanent magnet machine.

The framework described above provides an excellent support structure for multiple types of systems for wind power generation. Wind capturing devices, such as fiberglass blades 101 shown in FIG. 1 are supported on both ends and can be made lighter than the cantilevered blades on HAWTs that are only half their length. Alternatively, the wind capturing devices may be deployable sails, such as roller furling devices. These deployable sails may be activated by wind pressure as they come to the windward side of the turbine, could release a significant sail area that would be very effective at catching the wind on the downwind side of the turbine and roll up at the leeward side to dramatically reduce their resistance on one side of the turbine. Such a system would dramatically increase the efficiency of the VAWT without adding unreasonable complication. Also the ability to furl all of the sails in storm conditions dramatically reduces the windage exposure of the turbine. There are many other options for the system, as such, these examples are not meant to limit wind generation possibilities.

Alternatively, the wind capturing devices may be rigid blades, each with its leading edge hinged, like a vane. In this configuration, it will mitigate its windage on its up wind trip like a directional wind vane or a flag and then flip out to catch a maximum amount of wind on the downwind side of the turbine.

In another embodiment, the electrical generation section of the machine is direct drive generation at the perimeter, eliminating all drive shafts, gearboxes and conventional generators. A possible embodiment includes the case where windings are arrayed around the inside perimeter. These windings are connected through conventional brushes to the control system and energy source. The current to the windings in the rotor could be served such that there would be an increase or decrease to the magnetic drag and hence the power generated. By using this servo control to maintain a constant rpm, it would be possible to design the generator components to produce 60 Hz three phase power at that speed. Thus, when the wind blows harder, field resistances increase and more electricity is produced at the same speed. This would avoid a number of power conditioning issues.

Another embodiment employs permanent magnets on the perimeter of the rotor. This would be less expensive and possibly more efficient but would suffer from the need to convert the energy to DC and then back to AC of the rotor machine.

Figure 5:
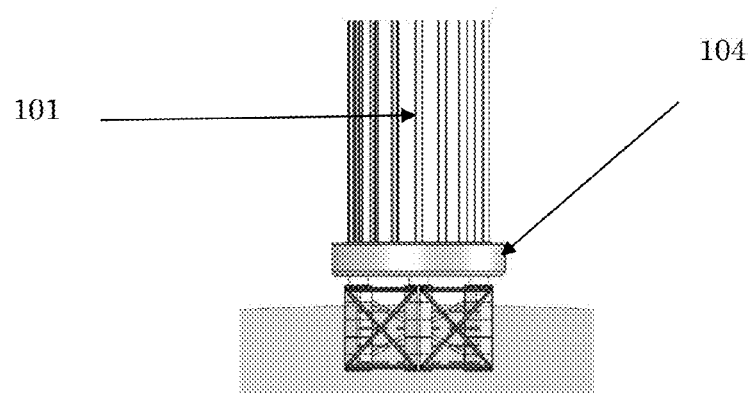
FIG. 5 is a side view of an offshore VAWT.

FIG. 5 shows another embodiment in which a method and apparatus are disclosed for floating a VAWT on a flotation system using at least three flotation points are provided. By not requiring a 360° base for the turbine the ability to float the turbine is greatly simplified. As can be seen by observing government navigation marks and buoys, wave action has little effect on the horizontal position of these marks. This element can be employed to maintain stability of the above water section of the turbine. Hollow float bodies that may be cylindrical or triangular in profile extend a multiple of their exposed lengths below the surface of the water. The connection of these floats to the bearing elements supporting the rotor would be consistent with description for the land-based turbines above.

In one embodiment these floats also have horizontal fins extending towards the center of the axis of rotation. These fins add vertical stability by requiring water to be displaced for the float to move through the water vertically. By extending these fins towards the center of the turbine they will stay clear of the structure used to tie the three floats together and the mooring tethers which may attach to the lower outside corner or perimeter of the float. These floats may be constructed of steel, aluminum or fiberglass for example.

In another embodiment, vertical stability of these floats may also be enhanced by allowing the lower section of these floats to fill with water. The water thus increases the mass of the float and so will act as a mass damper to the above water section of the turbine.

By using three floats, for example, calculations are relatively easy to direct the adjustment of the buoyancy of each float so as to keep the rotor of relatively parallel to sea level. This can be accomplished by using a compressor which is powering the air bearings to pump air into the top of the floats thus displacing water out the bottom of the floats. The hole in the bottom of the float is sized so as to maintain the damping effect with respect to relatively short-term wave action, but still allow for adjustments regarding longer-term changes in average wind speed over the period of several minutes.

The floats may also be equipped with internal compressed air cylinders. In the unusual event of a large hurricane class storm, air in the floats may be vented to atmosphere by a remotely controlled valve allowing the turbine to sink to the ocean floor and remain entirely below sea level until the storm has passed. When the storm has passed a remote controlled valve allows compressed air in the cylinders to again fill the float and raise the turbine to the surface. Because this turbine design does not contain a gearbox there may be little or no oil on board the turbine. The air compressor may require replacement as would safety lighting that would be required for the turbine and possibly some other minor components. However, the bearings and the generators would not be materially harmed by being submerged. This method of scuttling the turbine solves one of the major risk factors for offshore wind power generation.

Figure 6:
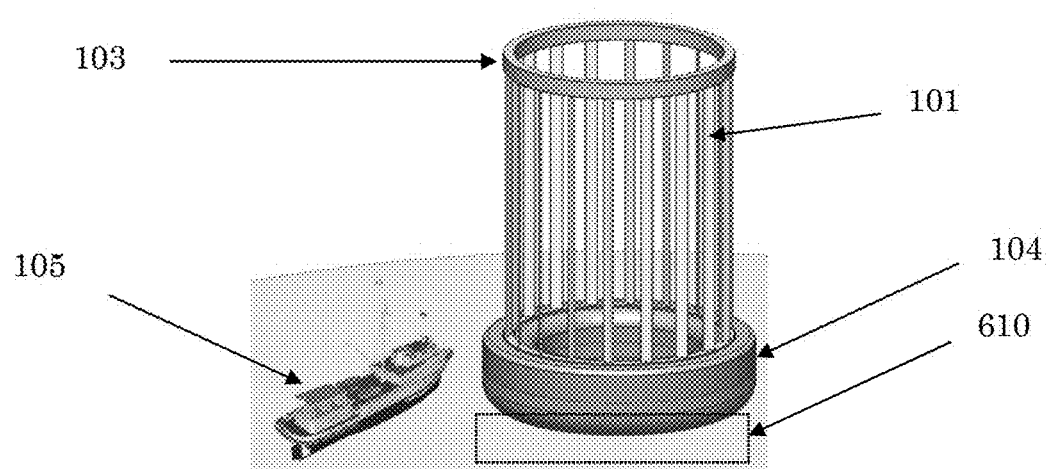
FIG. 6 is a side view of another offshore VAWT.

FIG. 6 shows another embodiment in which a method and apparatus for floating the VAWT are provided. The vertical axis wind turbine may be supported on a 360° floating hull 104 made of steel, aluminum or fiberglass, for example. It is recognized that there would be significant viscous sheer drag between the hull 104 and water, but the simplicity of this embodiment is compelling, requiring no weight carrying bearings for the turbine. The stator section of the generator component would be relatively light weight. In this embodiment the three mooring tethers would connect to this stator. The connection to the rotating and floating section of the turbine could be through rollers such as truck tires, for example. A ship 105 is also shown in FIG. 6.

There are multiple methods which may be employed in order to reduce the viscous drag of the hull in the water; Air bubbles could be released from the lowest section of the hull. Surface texture tricks which have been employed on sail boat hulls. Foils 610 may be deployed under the hull 104 that through a hydrodynamic action would lift the hull out of the water. This technique has been employed on military ships, furry ships catamaran sail boats and even the sailboat one design moth class.

It should be noted that in most normal cases, such a floating wind turbine would have a cable attached to it for the purpose of transmitting power that is generated by the turbine. It should be further noted that there may also be a cable carrying electrical power to the turbine for the purpose of safety lighting, providing energy for the air compressor or magnetic bearings and or providing conduit for communications, control and monitoring of the turbine functions.

Figure 7:
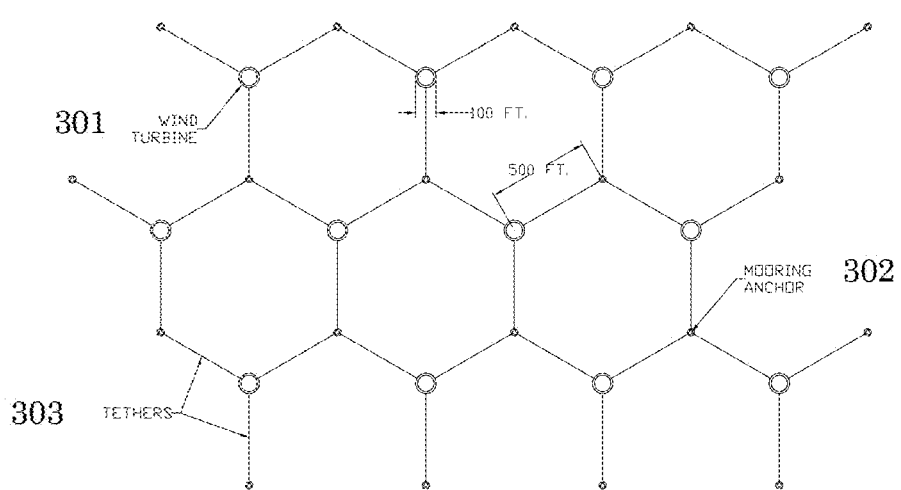
FIG. 7 is a schematic view of a network of offshore wind turbines and their respective mooring system.

FIG. 7 is a schematic view of a proposed network of offshore wind turbines and a proposed mooring system. The mooring system design includes a plurality of anchor points on a sea floor. Each of the plurality of anchor points are configured to anchor at least three vertical axis wind turbines (VAWTs) to the sea floor. Therefore, each anchor point is configured to secure at least one tether 303 from up three VAWTs.

Figure 8:
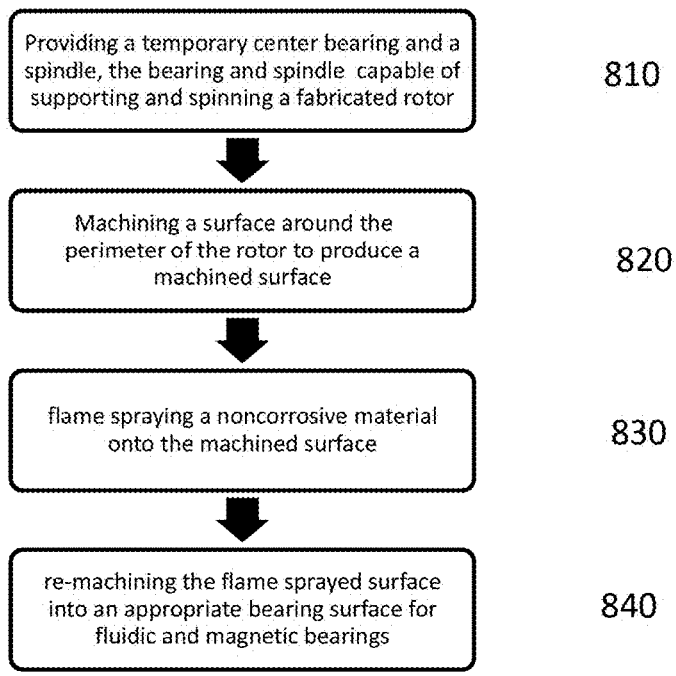
FIG. 8 is a flow diagram of a method of manufacturing large steel rotors.

FIG. 8 shows a method 800 of manufacturing large steel rotors used with fluidic and magnetic bearings used in wind turbines and flywheel energy storage devices. The method beings by providing a temporary center bearing and a spindle, the bearing and spindle capable of supporting and spinning a fabricated rotor, at step 810. Then machining a surface around a perimeter of the rotor to produce a machined surface, at step 820. Then, flame spraying a noncorrosive material onto the machined surface, at step 830. Then re-machining the flame sprayed surface into an appropriate bearing surface for fluidic and magnetic bearings, at step 840.

Although features and elements are described above in particular combinations, each feature or element can be used alone without the other features and elements or in various combinations with or without other features and elements.

What is claimed is:

1. A vertical axis wind turbine (VAWT) comprising:
   at least three bearing supports;
   a 360° rotor, having a precision machined bearing surface at its perimeter, with a system of wind capturing devices configured to collect kinetic energy of wind, wherein the rotor is supported substantially at the perimeter by the at least three bearing supports
   wherein the bearing supports are one of magnetic bearings, air bearings or fluidic bearings; and
   electrical generation components that are substantially at the perimeter of the rotor.

2. The VAWT of claim 1 wherein the at least three bearing supports are three air bearing supports configured to kinematically support the rotor.

3. A barge configured to generate electricity, the barge comprising:
   a hull configured to float; and
   a vertical axis wind turbine (VAWT), supported by the hull, wherein the VAWT is configured to generate electricity at a perimeter of the hull, wherein the VAWT comprises a 360° rotor, having a precision machined bearing surface at its perimeter, with a system of wind capturing devices configured to collect kinetic energy of wind, wherein the rotor is supported substantially at the perimeter by at least three bearing supports.

4. The barge of claim 3 further comprising: at least three tethers configured to connect the barge to the sea floor.

5. The barge of claim 3 wherein the hull includes a remotely controlled valve configured to flood the float and sink the turbine below sea level.

6. The barge of claim 5 wherein the hull includes a remotely controlled compressed air cylinder, or other source of compressed air, configured to fill the float with air and refloat the VAWT.

* * * * *